United States Patent
Si et al.

(10) Patent No.: US 11,934,044 B2
(45) Date of Patent: Mar. 19, 2024

(54) WS12-RELEASING CONTACT LENS

(71) Applicant: CooperVision International Limited, Fareham (GB)

(72) Inventors: Erwin C. Si, Alameda, CA (US); Victoria Rogers, Pleasanton, CA (US); Nancy J. Keir, Pleasanton, CA (US); Subam Basuthkar Sundar Rao, San Ramon, CA (US); Arthur Bradley, Bloomington, IN (US)

(73) Assignee: COOPERVISION INTERNATIONAL LIMITED, Fareham (GB)

( * ) Notice: Subject to any disclaimer, the term of this patent is extended or adjusted under 35 U.S.C. 154(b) by 0 days.

(21) Appl. No.: 18/279,214

(22) PCT Filed: Apr. 28, 2022

(86) PCT No.: PCT/GB2022/051077
§ 371 (c)(1),
(2) Date: Aug. 29, 2023

(87) PCT Pub. No.: WO2022/229641
PCT Pub. Date: Nov. 3, 2022

(65) Prior Publication Data
US 2024/0036354 A1 Feb. 1, 2024

Related U.S. Application Data

(60) Provisional application No. 63/181,268, filed on Apr. 29, 2021.

(51) Int. Cl.
*B29D 11/00* (2006.01)
*C08J 3/075* (2006.01)
(Continued)

(52) U.S. Cl.
CPC ........ *G02C 7/049* (2013.01); *B29D 11/00076* (2013.01); *B29D 11/00096* (2013.01); *C08J 3/075* (2013.01); *G02B 1/043* (2013.01)

(58) Field of Classification Search
CPC .............. G02C 7/049; B29D 11/00076; B29D 11/00096; C08J 3/075; G02B 1/043
(Continued)

(56) References Cited

U.S. PATENT DOCUMENTS 6,867,245 B2   3/2005   Iwata et al.
7,426,993 B2   9/2008   Coldrey et al.
(Continued)

FOREIGN PATENT DOCUMENTS

CA   3050553 A1 *   1/2021   .............. A61P 35/00
EP   0470703 A1   2/1992
(Continued)

OTHER PUBLICATIONS

International Search Report and Written Opinion issued in corresponding International Patent Application No. PCT/GB2022/051077 dated Sep. 14, 2022 (14 pages).
(Continued)

Primary Examiner — James R Greece
(74) Attorney, Agent, or Firm — Kilyk & Bowersox, P.L.L.C.

(57) ABSTRACT

A WS12-releasing contact lens is described as well as method of manufacturing the same. The WS12-releasing contact lens comprises a polymeric lens body and WS12 releasably adhered to the polymeric lens body, and releases from 0.05 μg to 0.5 μg WS12 after 1 hour in a release media or when worn by a human subject. The WS12-releasing contact lens can be comfortably worn by a symptomatic contact lens wearer and can increase the duration of comfortable lens wearing time and/or reduce lens awareness
(Continued)

events and/or reduce contact lens dryness in a symptomatic contact lens wearer.

24 Claims, 1 Drawing Sheet

(51) Int. Cl.
*G02B 1/04* (2006.01)
*G02C 7/04* (2006.01)

(58) Field of Classification Search
USPC .................................................. 351/159.02
See application file for complete search history.

(56) References Cited

U.S. PATENT DOCUMENTS

| | | |
|---|---|---|
| 8,231,218 B2 | 7/2012 | Hong et al. |
| 8,658,747 B2 | 2/2014 | Liu et al. |
| 8,865,789 B2 | 10/2014 | Yao et al. |
| 10,028,920 B2 | 7/2018 | Martinez et al. |
| 2020/0009044 A1 | 1/2020 | Horn |
| 2020/0061002 A1 | 2/2020 | Horn |
| 2022/0350163 A1 | 11/2022 | Si et al. |

FOREIGN PATENT DOCUMENTS

| | | |
|---|---|---|
| EP | 2439579 A1 | 4/2012 |
| EP | 3995493 A1 | 5/2022 |
| JP | 2014040598 A | 3/2014 |
| JP | 5568174 B1 | 8/2014 |
| JP | 2018028673 A | 2/2018 |
| WO | 2020061249 A2 | 3/2020 |
| WO | 2020178429 A1 | 9/2020 |

OTHER PUBLICATIONS

Combined Search and Examination Report issued in corresponding United Kingdom Patent Application No. GB2206172.5 dated Oct. 27, 2022 (10 pages).
PCT Demand filed Nov. 2, 2022 in corresponding International Patent Application No. PCT/GB2022/051077 (19 pages).
Second Written Opinion issued in corresponding International Patent Application No. PCT/GB2022/051077 dated Nov. 22, 2022 (6 pages).
Response to Second Written Opinion filed Dec. 19, 2022 in corresponding International Patent Application No. PCT/GB2022/051077 (13 pages).
International Preliminary Report on Patentability issued in corresponding International Patent Application No. PCT/GB2022/051077 dated Jul. 14, 2023 (13 pages).

* cited by examiner

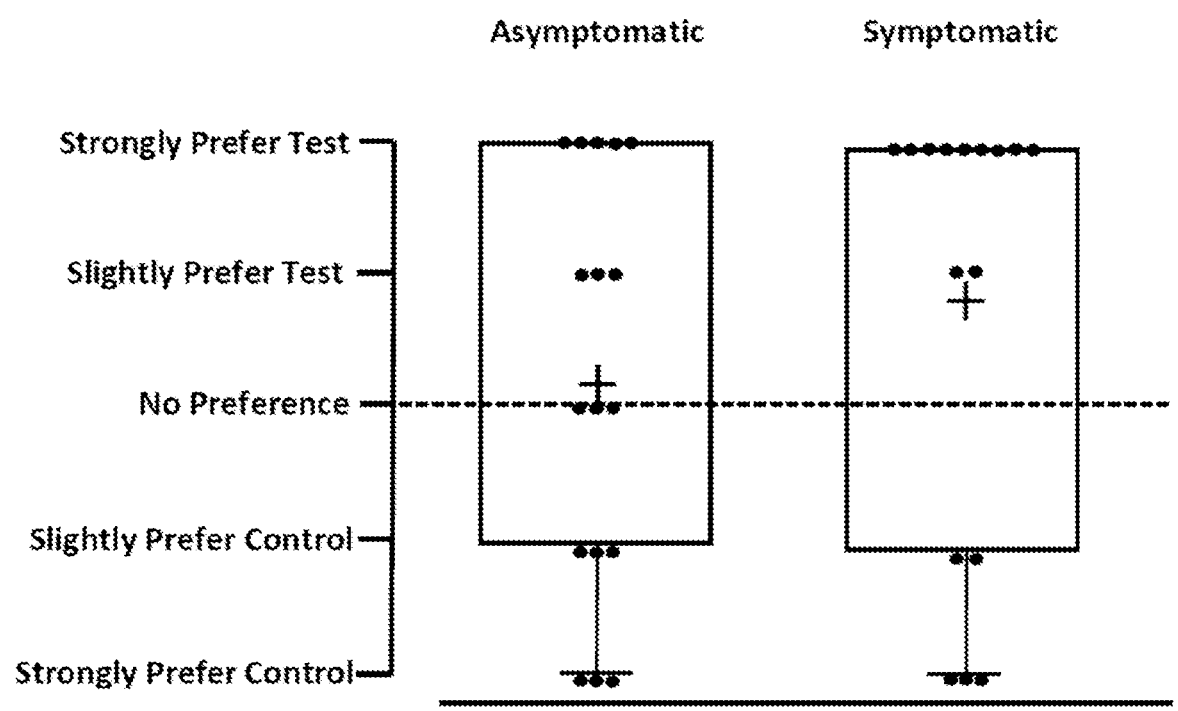

WS12-RELEASING CONTACT LENS

This application is a National Stage Application of PCT/GB2022/051077, filed Apr. 28, 2022, which in turn claims priority to U.S. Provisional Patent Application No. 63/181,268, filed Apr. 29, 2021.

FIELD OF THE INVENTION

The field of the invention relates to contact lenses, and particularly, to contact lenses that are more comfortable for symptomatic contact lens wearers.

BACKGROUND

An estimated 50% of all contact lens wearers experience discomfort while wearing their lenses, and approximately 25% of contact lens wearers permanently discontinue wearing lenses. Symptoms of ocular dryness is a primary reason for contact lens dissatisfaction. Despite advances in contact lens materials, there remains a need for improved contact lenses that can be comfortably worn by contact lens wearers who otherwise experience symptoms of ocular dryness while wearing contact lenses that are currently commercially available.

N-(4-Methoxyphenyl)-5-methyl-2-(1-methylethyl)cyclohexanecarboxamide (CAS No. 68489-09-8), known as WS12, is a synthetic menthol derivative that has been used as a cooling and flavoring agent in chewing gum and candies. It selectively activates transient receptor potential melastatin-8 (TRPM8) ion channels. Therapeutic compositions comprising TRPM8 receptor agonists for the treatment of dry eye have been proposed (Belmonte et al. U.S. Pat. No. 10,028,920).

SUMMARY

A feature of the present invention is to provide a hydrogel contact lens that can release WS12 during lens wearing.

An additional feature of the present invention is to provide a contact lens that can be comfortably worn by a symptomatic contact lens wearer.

An additional feature of the present invention is to increase the duration of comfortable lens wearing time and/or reduce contact lens dryness in a symptomatic contact lens wearer.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages, and in accordance with the purposes of the present invention, as embodied and broadly described herein, the present invention, in part relates to a hydrogel contact lens containing an amount of WS12 releasably adhered to the lens that enhances the comfort of the contact lens in a symptomatic lens wearer and/or reduces contact lens dryness in a symptomatic contact lens wearer. In one example, the hydrogel contact lens is a silicone hydrogel contact lens.

In one example, the silicone hydrogel contact lens is capable of releasing 0.05 µg to 0.5 µg WS12 after 1 hour in an in vitro release media consisting of 25 vol. % ethanol in phosphate buffered saline.

Furthermore, the present invention relates to a method of making the silicone hydrogel contact lens of the present invention. The method includes the steps of a) polymerizing a polymerizable composition (as described herein) in a contact lens mold to obtain a polymeric lens body, b) removing the polymeric lens body from the contact lens mold, c) extracting the polymeric lens body in an organic solvent comprising from about 5 ppm to about 50 ppm WS12, d) hydrating the polymeric lens body in a hydration liquid to obtain the silicone hydrogel contact lens, e) sealing said silicone hydrogel contact lens with packaging solution in a package, and f) autoclaving said package.

Furthermore, the present invention relates to a method of correcting the vision of a symptomatic contact lens wearer by providing to a symptomatic contact lens wearer a WS12-releasing hydrogel contact lens, wherein the WS12-releasing hydrogel contact lens contact lens increases the duration of comfortable contact lens wearing time and/or reduces contact lens dryness in the symptomatic contact lens wearer compared to a control lens that does not contain WS12. The present invention further relates to method of increasing the duration of comfortable contact lens wearing time and/or reducing symptoms of dryness in a contact lens wearer, by releasably adhering an amount of WS12 to a polymeric lens body of the contact lens and/or by providing to the contact lens wearer a WS12-releasing hydrogel contact lens of the present invention. The WS12-releasing hydrogel contact lens contact lens advantageously increases the duration of comfortable contact lens wearing time and/or reduces contact lens dryness in the symptomatic contact lens wearer compared to a control lens that does not contain WS12. The contact lens wearer is advantageously a symptomatic contact lens wearer. The invention also relates to the use of an amount of WS12 releasably adhered to the polymeric lens body of a hydrogel contact lens, in reducing symptoms of dryness in a contact lens wearer; in increasing comfortable lens wearing time by a contact lens wearer; in increasing tear meniscus height of a contact lens wearer; and/or in lowering CLDEQ-8 scores in a contact lens wear, wherein the contact lens wearer is advantageously a symptomatic contact lens wearer and/or wherein the hydrogel contact lens is advantageously a contact lens of the present invention as described herein. The invention also relates to a method of selecting a contact lens for correcting vision of a symptomatic contact lens wearer, for reducing symptoms of dryness in a contact lens wearer; for increasing comfortable lens wearing time by a contact lens wearer; for increasing tear meniscus height of a contact lens wearer; and/or for lowering CLDEQ-8 scores in a contact lens wearer, said method comprising selecting the hydrogel contact lens that can release WS12 during lens of the present invention, and providing it to the symptomatic contact lens wearer. The present invention also relates to a composition comprising a hydrogel releasbly adhered to WS12 for use in correcting vision of a symptomatic contact lens wearer; for use in reducing symptoms of dryness in a contact lens wearer; for use in increasing comfortable lens wearing time by a contact lens wearer; for use in increasing tear meniscus height of a contact lens wearer; and/or for use in lowering CLDEQ-8 scores in a contact lens wearer, wherein the composition is advantageously in the form of the contact lens of the present invention.

BRIEF DESCRIPTION OF THE DRAWING

FIG. 1 is a box plot showing symptomatic and asymptomatic contact lens wearers preference for either a WS12-releasing contact lens or a control lens after 30 days of lens wear.

DETAILED DESCRIPTION

Through extensive experimentation, the inventors have discovered that unlike other TRPM8 receptor agonists evaluated, menthol derivative WS12 (CAS No 68489-09-8) can be incorporated into hydrogel contact lens materials and remain within the lens material without degradation or leaching during standard contact lens sterilization and storage conditions. Once the contact lens is placed on an eye, the WS12 continuously releases from the lens over several hours to provide improved comfort in symptomatic contact lens wearers. Accordingly, hydrogel contact lenses that release WS12 during wear and their method of manufacture are described herein. The contact lens can be referred to herein as a WS12-releasing contact lens. WS12 is released from the lens during wear in amounts that improves the comfort of contact lens wear in symptomatic contact lens wearers.

As an option, the contact lens has no other TRPM8 receptor agonist present.

As an option, the contact lens has no other agent for ocular dryness present.

The WS12-releasing contact lens comprises a polymeric lens body and an amount of WS12 releasably adhered to the polymeric lens body. As one example, the contact lens is a reaction product of a polymerizable composition for a non-silicone hydrogel. Non-silicone hydrogel contact lenses are typically formed from polymerization of one or more hydrophilic monomers such as 2-hydroxyethyl methacrylate (HEMA) or vinyl alcohol, optionally in combination with other monomers, and contains no siloxane molecule.

As one example, the contact lens comprises a polymeric lens body that is the reaction product of a polymerizable composition comprising at least one siloxane monomer and at least one hydrophilic monomer and/or at least one hydrophilic polymer. Conveniently, as described in more detail below, a cured polymeric lens body for a silicone hydrogel may be extracted in an extraction solvent containing the WS12 which results in the desired amount of WS12 adhering to the polymeric lens body. Alternatively, or additionally, the WS12 may be added to the polymerizable composition. The WS12 may be adhered to the polymeric lens body by hydrophobic interaction, and/or may be physically entrapped by the polymer network of the polymeric lens body.

The amount of WS12 "releasably adhered" to the polymeric lens body refers to the total amount of WS12 that can be extracted from the contact lens by an ethanol (EtOH) extraction method as described in Example 1 below. In one example, the amount of WS12 releasably adhered to the polymeric lens body can be at least about 0.25 µg, or 0.50 µg, up to about 2.5 µg, 5.0 µg, or 10.0 µg, such as from about 0.30 µg to about 3.0 µg.

As used herein, and unless context dictates otherwise, a reference to an in vitro release profile of a WS12-releasing contact lens refers to the amount of WS12 released from the lens over a period of time as measured using the in vitro release media (25 vol % EtOH in PBS) and the method described in Example 4 below. An in vitro release method that employs a protein-free release media comprising EtOH provides a less variable release profile than when an artificial tear film composition (ATF) is used as the release media and is useful for determining the effect a particular lens material has on WS12 release. For example, a polymeric lens body made of one material and having a certain amount of WS12 releasably adhered to a polymeric lens body may have a different WS12 release profile than a polymeric lens body made of a different material but having the same amount of WS12 releasably adhered thereto. Some properties of the polymeric lens body that may affect the WS12 release profile include the hydrophobicity of the material, the water content, and the degree of cross-linking of the polymeric lens body. Additionally, encapsulation technologies, such as liposomes or erodible nanoparticles, may be used to encapsulate a portion or all of the WS12 prior to incorporating it into the polymeric lens body to delay or extend release of WS12 from the lens. For instance, from 10 wt % to 80 wt % or more of the WS12 incorporated into the contact lens can have this delayed release property. A WS12-releasing contact lens is considered to sustain release of WS12 for a certain number of hours, x, when the amount of WS12 released after x hours is greater than the amount of WS12 released after x−1 hour, when measured using the in vitro release method of Example 4, using 25 vol % EtOH in PBS as the release media. In one example, the WS12-releasing lens sustains release of WS12 for at least 6 hours. In one example, the WS12-releasing lens may have an in vitro release profile in which 0.05 µg to 0.5 µg WS12 is released per hour for at least 6 hours, or between 0.1 µg to 0.4 µg WS12 per hour for at least 6 hours, or between 0.1 µg to 0.3 µg WS12 per hour for at least 6 hours, when measured using the in vitro release method of Example 4. In some examples, the contact lens sustains release of WS12 for at least 8 hours or at least 10 hours.

To determine the amount of WS12 released from a WS12-releasing contact lens when worn, human subjects (n=3) wear the WS12-releasing lens in both eyes for a specified period of time. The amount of WS12 released from the lens at the specified time point is the difference between the average amount of WS12 in the unworn WS12-releasing lens (n=3) and the average amount of WS12 remaining in the worn lens at the time point tested. In one example, the WS12-releasing lens releases from 0.05 µg to 0.75 µg WS12, or from 0.05 µg to 0.50 µg WS12, after one hour of wear. In a further example, the WS12-releasing lens releases from 0.10 µg to 1.5 µg WS12, or from 0.25 µg to 1.0 µg WS12, after three hours of wear. In yet a further example, the WS12-releasing lens releases from 0.25 µg to 2.0 jig, or from 0.5 µg to 1.5 µg WS12 after six hours of wear.

The polymeric lens body may comprise any hydrogel material suitable for use as a contact lens material. A silicone hydrogel material for contact lenses is typically formed by curing a polymerizable composition (i.e. a monomer mixture) comprising at least one siloxane monomer and at least one hydrophilic monomer or at least one hydrophilic polymer, or a combination thereof. As used herein, the term "siloxane monomer" is a molecule that contains at least one Si—O group and at least one polymerizable group. Siloxane monomers used in contact lens compositions are well-known in the art (see, e.g., U.S. Pat. Nos. 8,658,747 and 6,867,245). (All patents and publications mentioned here and throughout are incorporated in their entirety by reference.) In some examples, the polymerizable composition comprises a total amount of siloxane monomer of at least 10 wt. %, 20 wt. %, or 30 wt. % up to about 40 wt. %, 50 wt. %, 60 wt. %, or 70 wt. %. Unless specified otherwise, as used herein, a given weight percentage (wt. %) of a component of the polymerizable composition is relative to the total weight of all polymerizable ingredients and IPN polymers (as described further below) in the polymerizable composition. The weight of the polymerizable composition contributed by components, such as diluents, that do not incorporate into the final contact lens product are not included in the wt. % calculation.

In a specific example, the polymerizable composition comprises a hydrophilic vinyl monomer. As used-herein, a "hydrophilic vinyl monomer" is any siloxane-free (i.e. contains no Si—O groups) hydrophilic monomer having a polymerizable carbon-carbon double bond (i.e., a vinyl group) present in its molecular structure that is not part of an acryl group, where the carbon-carbon double bond of the vinyl group is less reactive than the carbon-carbon double bond present in a polymerizable methacrylate group under free radical polymerization. As used herein, the term "acryl group" refers to the polymerizable group present in acrylate, methacrylates, acrylamides, etc. Thus, while carbon-carbon double bonds are present in acrylate and methacrylate groups, as used herein, such polymerizable groups are not considered to be vinyl groups. Further, as used herein, a monomer is "hydrophilic" if at least 50 grams of the monomer are fully soluble in 1 liter of water at 20° C. (i.e., ~5% soluble in water) as determined visibly using a standard shake flask method. In various examples, the hydrophilic vinyl monomer is N-vinyl-N-methylacetamide (VMA), or N-vinyl pyrrolidone (NVP), or 1,4-butanediol vinyl ether (BVE), or ethylene glycol vinyl ether (EGVE), or diethylene glycol vinyl ether (DEGVE), or any combination thereof. In one example, the polymerizable composition comprises at least 10 wt. %, 15 wt. %, 20 wt. %, or 25 wt. % up to about 45 wt. %, 60 wt. %, or 75 wt. % of a hydrophilic vinyl monomer. As used herein, a given weight percentage of a particular class of component (e.g., hydrophilic vinyl monomer, siloxane monomer, or the like) in the polymerizable composition equals the sum of the wt. % of each ingredient in the composition that falls within the class. Thus, for example, a polymerizable composition that comprises 5 wt. % BVE and 25 wt. % NVP and no other hydrophilic vinyl monomer, is said to comprise 30 wt. % hydrophilic vinyl monomer. In one example, the hydrophilic vinyl monomer is a vinyl amide monomer. Exemplary hydrophilic vinyl amide monomers are VMA and NVP. In a specific example, the polymerizable composition comprises at least 25 wt. % of a vinyl amide monomer. In a further specific example, the polymerizable composition comprises from about 25 wt. % up to about 75 wt. % of VMA or NVP, or a combination thereof. Additional hydrophilic monomers that may be included in the polymerizable composition are N,N-dimethylacrylamide (DMA), 2-hydroxyethyl methacrylate (HEMA), ethoxyethyl methacrylamide (EOEMA), ethylene glycol methyl ether methacrylate (EGMA), and combinations thereof.

In addition, or as an alternative to a hydrophilic monomer, the polymerizable composition may comprise a non-polymerizable hydrophilic polymer, which results in a polymeric lens body comprising an interpenetrating polymer network (IPN) with the non-polymerizable hydrophilic polymer interpenetrating the silicone hydrogel polymer matrix. In this example, the non-polymerizable hydrophilic polymer is referred to as an IPN polymer, which acts as an internal wetting agent in the contact lens. In contrast, polymer chains within the silicone hydrogel network that form by polymerization of monomers present in the polymerizable composition are not considered to be IPN polymers. The IPN polymer may be a high molecular weight hydrophilic polymer, for example from about 50,000 to about 500,000 Daltons. In a specific example, the IPN polymer is polyvinylpyrrolidone (PVP). In other examples, the polymerizable composition is substantially free of polyvinyl pyrrolidone or other IPN polymer.

As an option, one or more non-silicon containing hydrophobic monomers can be present as part of the polymerizable composition. A hydrophobic monomer can be understood to be any monomer for which 50 grams of the monomer are not visibly fully soluble in 1 liter of water at 20° C. using a standard shake flask method. Examples of suitable hydrophobic monomers include methyl acrylate, or ethyl acrylate, or propyl acrylate, or isopropyl acrylate, or cyclohexyl acrylate, or 2-ethylhexyl acrylate, or methyl methacrylate (MMA), or ethyl methacrylate, or propylmethacrylate, or butyl acrylate, or 2-hydroxybutyl methacrylate, or vinyl acetate, or vinyl propionate, or vinyl butyrate, or vinyl valerate, or styrene, or chloroprene, or vinyl chloride, or vinylidene chloride, or acrylonitrile, or 1-butene, or butadiene, or methacrylonitrile, or vinyltoluene, or vinyl ethyl ether, or perfluorohexylethylthiocarbonylaminoethyl methacrylate, or isobornyl methacrylate (IBM), or trifluoroethyl methacrylate, or hexafluoroisopropyl methacrylate, or tetrafluoropropyl methacrylate, or hexafluorobutyl methacrylate, or any combinations thereof.

The hydrophobic monomer, if used, can be present in the reaction product of the polymerizable composition in amounts of from 1 wt. % to about 30 wt. %, such as from 1 wt. % to 25 wt. %, from 1 wt. % to 20 wt. %, from 1 wt. % to 15 wt. %, from 2 wt. % to 20 wt. %, from 3 wt. % to 20 wt. %, from 5 wt. % to 20 wt. %, from 5 wt. % to 15 wt. %, from 1 wt. % to 10 wt. %, based on the total weight of the polymerizable composition.

As will be appreciated by those skilled in the art, the polymerizable composition may comprise additional polymerizable or non-polymerizable ingredients conventionally used in contact lens formulations such as one or more of a polymerization initiator, a UV absorbing agent, a tinting agent, an oxygen scavenger, a chain transfer agent, or the like. In some examples, the polymerizable composition may include an organic diluent in an amount to prevent or minimize phase separation between the hydrophilic and hydrophobic components of the polymerizable composition, so that an optically clear lens is obtained. Diluents commonly used in contact lens formulations include hexanol, ethanol, and/or other alcohols. In other examples, the polymerizable composition is free or substantially free (e.g., less than 500 ppm) of an organic diluent. In such examples, the use of siloxane monomers containing hydrophilic moieties such as polyethylene oxide groups, pendant hydroxyl groups, or other hydrophilic groups, may make it unnecessary to include a diluent in the polymerizable composition. Non-limiting examples of these and additional ingredients that may be included in the polymerizable composition are provided in U.S. Pat. No. 8,231,218.

Non-limiting examples of silicone hydrogels that may be used include comfilcon A, fanfilcon A, stenfilcon A, senofilcon A, senofilcon C. somofilcon A, narafilcon A, delefilcon A, narafilcon A, lotrafilcon A, lotrafilcon B, balafilcon A, samfilcon A, galyfilcon A, and asmofilcon A.

A specific example of a silicone hydrogel contact lens of the present invention is one that is based on a polymerizable composition comprising from 25 wt. % to 55 wt. % of a siloxane monomer(s), from 30 wt. % to 55 wt. % of a vinyl monomer selected from NVP, VMA, or combinations thereof, and optionally from about 1 wt. % to about 20 wt. % of a hydrophilic monomer selected from N,N-dimethylacrylamide (DMA), 2-hydroxyethyl methacrylate (HEMA), ethoxyethyl methacrylamide (EOEMA), or ethylene glycol methyl ether methacrylate (EGMA), or any combination thereof, and optionally from about 1 wt. % to about 20 wt. % of a hydrophobic monomer selected from methyl methacrylate (MMA), isobornyl methacrylate (IBM), or 2-hydroxybutyl methacrylate (HOB) or any combination thereof. Silicone hydrogel materials made from this specific embodiment of polymerizable composition include stenfilcon A, comfilcon A, somofilcon A, fanfilcon A, and enfilcon A.

Conventional methods can be used to manufacture the contact lens of the invention. As an example, a polymerizable composition for a silicone hydrogel composition is dispensed into a female mold member having a concave surface that defines the front surface of the contact lens. A male mold member having a convex surface that defines the back surface of the contact lens, i.e. the cornea-contacting surface, is combined with the female mold member to form a contact lens mold assembly that is subjected to curing conditions, such as UV or thermal curing conditions, under which the curable composition is formed into a polymeric lens body. The female and male mold members can be non-polar molds or polar molds. The mold assembly is disassembled (i.e. demolded) and the polymeric lens body is removed from the mold and contacted with a solvent, for instance, an organic solvent, such as ethanol, to extract unreacted components from the lens body. After extraction, the lens body is hydrated in one or more hydration liquids such as water or an aqueous solution and packaged. Exemplary methods of manufacturing silicone hydrogel contact lenses are described in U.S. Pat. No. 8,865,789.

The WS12 may be loaded into the polymeric lens during the extraction step. Generally, after curing, the polymeric lens body is swelled in an extraction solvent, such as ethanol, which contains the WS12. When the extracted polymeric lens body is subsequently placed in a hydration solution, such as deionized water, the extraction solvent is removed, and the WS12 remains adhered to the polymeric lens body.

Examples of the extraction solvents and hydration liquids used in an extraction and hydration process can consist of denatured ethanol, a 50/50 (by vol) mixture of denatured ethanol and deionized water, and deionized water. As an example, the extraction and hydration process can involve at least one extraction step in denatured ethanol followed by a 50:50 mixture of ethanol water followed by at least one hydration step in deionized water, and wherein each extraction and hydration step can last from about 15 minutes to about 3 hours at a temperature of from about 20° C. and to about 30° C. An extraction solvent can contain the WS12 to achieve uploading of the WS12 to the polymeric lens body.

Any extraction solvent used as an uploading solution for the WS12 can contain a concentration of WS12 of at least 1.0 µg/ml. This concentration can be at least 2.5 µg/ml, at least 5.0 µg/ml, or at least 10.0 µg/ml WS12. In one example, the concentration of WS12 in the extraction solvent is from about 5.0 µg/ml to about 50.0 µg/ml (i.e. 5 ppm to about 50 ppm).

In some examples, the WS12, once adhered to the polymeric lens body is stable and does not substantially release from the polymeric lens body or degrade during autoclaving of the sealed contact lens package that contains the unworn hydrogel contact lens in a packaging solution, or during storage in its packaging solution, but does release during lens wear. Thus, the packaging solution that the contact lens is immersed in, before autoclaving, or immediately after autoclaving, or after 1 day thereafter, or after 30 days thereafter, or after 60 days thereafter, or after 120 days thereafter has a concentration of WS12 that is less than 0.1 µg/ml or less than 0.05 µg/ml or has a concentration of WS12 that is less than the level of detection as determined by HPLC.

As part of the present invention, the contact lens can be sealed in a contact lens package. The packaging solution sealed within the contact lens package may be any conventional contact-lens compatible solution. In one example, the packaging solution comprises, consists, or consists essentially, of an aqueous solution of a buffer, and/or a tonicity agent. In another example, the packaging solution contains additional agents such as one or more additional antimicrobial agents, and/or a comfort agent, and/or a hydrophilic polymer, and/or a surfactant and/or other beneficial agent. In some examples, the packaging solution may comprise polysaccharides (e.g. hyaluronic acid, hydroxypropyl methylcellulose, hydroxypropyl cellulose, hydroxyethyl cellulose, etc.) or other high molecular weight polymers, such as polyvinyl pyrrolidone, which are commonly used as comfort polymers or thickening agents in ophthalmic solutions and contact lens packaging solutions. In other examples, the packaging solution may comprise an ophthalmic drug. The packaging solution can have a pH in the range of about 6.8 or 7.0 up to about 7.8 or 8.0. In one example, the packaging solution comprises phosphate buffer or borate buffer. In another example, the packaging solution comprises a tonicity agent selected from sodium chloride or sorbitol in an amount to maintain osmolality in the range of about 200 to 400 mOsm/kg, and typically from about 270 mOsm/kg up to about 310 mOsm/kg.

With respect to the contact lens package, this package can include or comprise a plastic base member comprising a cavity configured to retain the contact lens and packaging solution and a flange region extending outwardly around the cavity. A removable foil is attached to the flange region to provide a sealed contact lens package. Such contact lens packages, which are commonly referred to as "blister packs", are well-known in the art (see e.g. U.S. Pat. No. 7,426,993).

It will be appreciated that conventional manufacturing methods can be used to manufacture the sealed contact lens package. In a method of manufacturing a contact lens package, the method can include the step of placing an unworn contact lens and a contact lens packaging solution in a receptacle, placing a cover on the receptacle, and sealing the cover on the receptacle. Generally, the receptacle is configured to receive a single contact lens and an amount of packaging solution sufficient to completely cover the contact lens, typically about 0.5-1.5 ml. The receptacle may be made from any suitable material, such as glass or plastic. In one example, the receptacle comprises a plastic base member comprising a cavity configured to retain the contact lens and packaging solution and a flange region extending outwardly around the cavity, and the cover comprises a removable foil attached to the flange region to provide the sealed contact lens package. The removable foil may be sealed by any conventional means such as heat sealing or gluing. In another example, the receptacle is in the form of a plastic base member comprising a plurality of threads and the cover comprises a plastic cap member comprising a compatible set of thread for engagement with the threads of the base member thereby providing a resealable cover. It will be appreciated that other types of packaging can also be used to provide a resealable package. For example, the contact lens package may comprise a plastic cover comprising features that engage with compatible features of the receptacle to form an interference fit. The method of manufacturing the sealed contact lens package may further comprise sterilizing the unworn contact lens by autoclaving the sealed contact lens package. Autoclaving generally involves subjecting the sealed contact lens package to temperatures of at least 121° C. for at least 20 minutes.

The contact lens can be provided unworn (i.e. a new contact lens, not having been previously used by a patient), immersed in the packaging solution and sealed in a package. The package may be a blister package, glass vial, or other appropriate container. The package comprises a base member having a cavity for accommodating a packaging solution and an unworn contact lens. The sealed package may be sterilized by sterilizing amounts of radiation, including heat or steam, such as by autoclaving, or by gamma radiation, e-beam radiation, ultraviolet radiation, etc.

In a specific example, the packaged contact lens is sterilized by autoclaving.

The final product can be a sterile, packaged contact lens (e.g. silicone hydrogel contact lens) having ophthalmically-acceptable surface wettability.

The WS12-releasing hydrogel contact lens described herein can be used to correct vision of a symptomatic contact lens wearer. For example, the WS12-releasing hydrogel contact lens can increase the duration of comfortable contact lens wearing time in a symptomatic contact lens wearer. References herein to a "symptomatic contact lens wearer" or "symptomatic subject" refers to a lens wearer that is classified as symptomatic using the method described in Example 6 below adapted from Young et al. (Young et al. *Characterizing contact lens-related dryness symptoms in a cross-section of UK soft lens wearers*. Contact Lens & Anterior Eye 34 (2011) 64-70).

The WS12-releasing hydrogel contact lens described herein may be worn by a symptomatic contact lens wearer to reduce the sensation of "dryness", particularly at the end of the day compared to a control lens or the symptomatic wearer's habitual lenses. References herein to a "control lens" refer to a contact lens that contains no WS12 but is otherwise identical to the WS12-releasing lens to which it is being compared. A reduction in lens dryness during contact lens wear can be determined using the characterization method described in Example 6. Overall lens preference for the WS12-releasing hydrogel contact lens in symptomatic contact lens wearers is another way to measure/ascertain its beneficial impact on contact lens discomfort/dryness.

The WS12-releasing hydrogel contact lens described herein may result in reduced lens awareness and/or result in fewer "lens awareness events" during the day compared to a control lens. A reduction in lens awareness and/or lens awareness events during contact lens wear can be determined using a "lens awareness logger" as described by Read et al. (see Read et al., *Monitoring ocular discomfort using a wrist-mounted electronic logger*. Contact Lens and Anterior Eye Vol. 43 (2020) 476-483.

The WS12-releasing hydrogel contact lens described herein may result in an increased tear film meniscus height compared to a control lens after wearing the lenses for 1 hour, 2 hours, 4 hours or more. Tear film meniscus height may be measured by optical coherence tomography (OCT) or other suitable method.

The WS12-releasing hydrogel contact lens described herein can improve (i.e. lower) CLDEQ-8 scores in a symptomatic lens wearer. (see Chalmers et al., *Contact Lens Dry Eye Questionnaire-8 (CLDEQ-8) and opinion of contact lens performance*. Optom Vis Sci 2012; 89(10):1435-1442.). Improvements in CLDEQ-8 score may be seen after 1 week of wearing the WS12-releasing hydrogel contact lens, or after 2 weeks, or after 4 weeks.

Some subjects may experience initial stinging or cooling sensations after inserting a WS12-releasing lens, which decrease after wearing the lenses daily for a period of time, suggesting an adaptation to WS12. Initial unpleasant sensations may be reduced or avoided by starting a patient on a WS12-releasing contact lens that has a lower WS12 release rate. After wearing the low dose WS12-releasing contact lens for several days, the patient adapts to WS12 and can be switched to a contact lens that has a higher WS12 release rate without experiencing any initial insertion discomfort. The low dose WS12-releasing contact lens may be considered a "starter" WS12-releasing lens. In some examples, a patient may wear a starter WS12-releasing lens daily, such as for 3, 5, 7 or 10 days, prior to switching a WS12-releasing contact lens that has a higher WS12 release rate for improving the comfort of contact lens wear in symptomatic contact lens. The starter WS12-releasing lens may release from about 0.05 up to about 0.2 µg WS12 after 1 hour in an in vitro release media in accordance with the method of Example 4.

A "starter trial pack" or kit can be provided that comprises at least two WS12-releasing contact lenses, wherein a first contact lens comprises a first polymeric lens body and a first amount of WS12 releasably adhered to the first polymeric lens body, and a second contact lens comprising a second polymeric lens body and a second amount of WS12 releasably adhered to the second polymeric lens body, wherein the second amount is greater than the first amount and wherein the first polymeric lens body and the second polymeric lens body comprise the same material. In some examples, the starter trial pack may comprise a third WS12-releasing contact lens comprising a third polymeric lens body and a third amount of WS12 releasably adhered to the third polymeric lens body, wherein the third amount is greater than the second amount and wherein the first, second, and third polymeric lens bodies comprise the same material. Each individual WS12-releasing contact lens of the starter trial pack may be immersed in a packaging solution and sealed in a package, such as a blister package, sterilized, and packaged in secondary packaging such as a carton. A package insert may be included in the secondary packaging that instructs the lens wearer to wear the lenses containing the lower amount of WS12 prior to wearing the lenses containing a higher amount of WS12. The primary packaging of the starter WS12-releasing lenses may differ in appearance, such as by color, from the lenses having a higher WS12 release rate lenses.

The following Examples illustrate certain aspects and advantages of the present invention, which should be understood not to be limited thereby.

Example 1. Preparation of WS12-Releasing Contact Lenes

Silicone hydrogel contact lenses were prepared by curing the formulation for stenfilcon A in contact lens molds. The cured stenfilcon A was removed from the molds and extracted by immersing them for 215 minutes in ethanol (EtOH) containing WS12 (Tocris Bioscience) in the loading concentrations shown in Table I. The lenses were removed from the EtOH and washed in DI water for approximately 6 minutes, followed by two exchanges of DI water for approximately 30 minutes each. The lenses were transferred to 6 mL glass vials containing 3 mL phosphate buffered saline at pH 7.5 (0.78 wt. % NaCl, 0.05 wt. % sodium phosphate monobasic, and 0.36 wt. % sodium phosphate dibasic), referred to herein as PBS. The vials were sealed and autoclaved.

Each autoclaved lens was transferred to a vial containing 3 ml EtOH and stored overnight on a 150 rpm shaker at room temperature to extract WS12 from the lens. The EtOH extracts and the PBS in which the lenses were autoclaved were submitted for analysis by HPLC (detection wavelength=250 nm) against calibration standards to determine the average amount of WS12 loaded into each (n=5) and whether the WS12 leaches from the lens during autoclave. Results are shown in Table 1.

TABLE 1

| Lens ID | WS12 loading concentration | Ave. WS12/lens | WS12 concentration in PBS packaging solution |
|---|---|---|---|
| A | 5 µg/mL | 0.42 µg | Not detected |
| B | 15 µg/mL | 1.28 µg | Not detected |
| C | 50 µg/mL | 4.30 µg | 0.05 µg/mL |

Silicone hydrogel contact lenses were prepared by curing the formulation for comfilcon A in contact lens molds and subjecting the lenses to the same extraction, hydration, and autoclave procedures as described above for lenses made with stenfilcon A except that a single WS12 concentration, 15 µg/mL, was used in the ethanol extraction step. The lenses (Lens D) were submitted for HPLC analysis of WS12 content and were shown to have an average WS12 uptake of 1.04 µg/lens.

Example 2. In Vitro Release of WS12-Releasing Contact Lenses in 5 Vol. % EtOH

Lens B and Lens D from Example 1 were removed from their vials and excess packaging solution was shaken off each lens. Each lens (n=3 for each time point) was transferred to a 6 ml glass file containing 3 ml of 5 vol. % ethanol in PBS at 35° C. The vials were placed on a shaker at 125 rpm in a 35° C. incubator. At the 30 minute and 1-hour time points 2.5 ml of the EtOH release media was removed (i.e. from 30 minute and 1-hour-time point vials, respectively) and submitted for HPLC analysis. At the 1 hour time point, and subsequent time points (i.e. at 2 hr, 3 hr, and 4 hr) 2.5 ml of the EtOH release media was removed from each of the remaining vials and 2.5 ml fresh EtOH release media was added back to each vile. Table 2 below shows the cumulative WS12 release for each lens material. For example, the 3-hour time point is the sum of the amount of WS12 detected in the release media taken at the 1-hour, 2-hour, and 3-hour time points.

TABLE 2

| Time Point (hr) | Lens B Ave. amt. WS12 released per lens | Lens B Ave. percent WS12 released per lens | Lens D Ave. amt. WS12 released per lens | Lens D Ave. percent WS12 released per lens |
|---|---|---|---|---|
| 0.5 | 0.03 µg | 2% | 0.03 µg | 3% |
| 1 | 0.05 µg | 5% | 0.06 µg | 6% |
| 2 | 0.09 µg | 8% | 0.11 µg | 10% |
| 3 | 0.12 µg | 10% | 0.15 µg | 14% |
| 4 | 0.15 µg | 13% | 0.19 µg | 18% |
| 5 | 0.18 µg | 16% | 0.22 µg | 21% |
| 6 | 0.21 µg | 18% | 0.25 µg | 24% |

Example 3. Release of WS12 from Contact Lenses During Lens Wear

Lens B was worn by a human subject for 1, 3, and 6 hours (n=2 for each time point). At the end of each lens wear duration, the lenses were extracted in EtOH using the method described in Example 1. Extracts were submitted for HPLC analysis to determine the residual amount of WS12 remaining in the lenses and the amount of WS12 released during wear was calculated. The average amount and percent of WS12 released during lens wear is shown in Table 3.

TABLE 3

| Time Point (hr) | Ave. amt. WS12 released per lens | Ave. percent WS12 released per lens |
|---|---|---|
| 1 | 0.22 µg/mL | 17% |
| 3 | 0.51 µg/mL | 40% |
| 6 | 0.69 µg/mL | 54% |

Example 4. In Vitro Release of WS12-Releasing Contact Lenses in 25 Vol. % EtOH

To achieve an in vitro release method that more closely approximates the release of WS12 during lens wear, release of WS12 from Lens B was tested using the method of Example 2 except that higher concentrations of EtOH, at 15%, 20%, 25% or 30%, were used in the release media. The release media consisting of 25 vol. % EtOH/75 vol. % PBS, most closely approximated the release of WS12 from lenses when worn for 6 hours; results are shown in Table 4.

TABLE 4

| Time Point (hr) | Lens B Ave. amt. WS12 released per lens | Lens B Ave. percent WS12 released per lens |
|---|---|---|
| 0.5 | 0.13 µg | 9% |
| 1 | 0.24 µg | 17% |
| 3 | 0.44 µg | 31% |
| 6 | 0.60 µg | 43% |

Example 5. Dose-Escalating, One-Day Clinical Study of WS12-Releasing Contact Lenses Two subjects were recruited into the study in which all three loading concentrations from Example 1 were evaluated. Each subject was exposed to Lens A, B and C from Example 1 for 30 minutes each in one eye, worn contralaterally. On the first study day, the subjects were exposed to contralateral wear of Lens B and Lens C, followed by contralateral wear of Lens B and Lens A on a separate day. With Lens C, one subject experienced a stinging sensation, while the other subject experienced a cooling sensation. With Lens B both subjects experienced a mild cooling/tingling sensation that lasted approximately one hour. Lens A elicited a brief cooling/wetting sensation in the subjects. Lens B was selected for further evaluation.

Example 6. Thirty-Day Clinical Study of WS12-Releasing Contact Lenses

Thirty-three subjects were enrolled in a 1-month, bilateral, randomized, crossover double-masked study where subjects wore both Lens B from Example 1 (test) or MyDay® brand (control) contact lenses, each for 1-month. The subjects were classified as either symptomatic (S) or asymptomatic (A) contact lens wearers using the classification system outlined in Table 5, which is adapted from the classification proposed by Young et al. (supra).

TABLE 5

|  |  | Frequency of contact lens dryness/discomfort | | | | |
| --- | --- | --- | --- | --- | --- | --- |
|  |  | Never | Rarely | Sometimes | Frequently | Constantly |
| Intensity of contact lens dryness discomfort | Never have it 0 | A | A | A | A | A |
|  | Not at all intense 1 | A | A | A | A | A |
|  | 2 | A | A | S | S | S |
|  | 3 | A | A | S | S | S |
|  | 4 | A | A | S | S | S |
|  | Very intense 5 | A | A | S | S | S |

Sixteen of the subjects were classified as symptomatic contact lens wearers, reporting a rating of 2 or more out of 5 for Intensity of contact lens dryness/discomfort and "sometimes, frequently or constantly" for Frequency of contact lens dryness/discomfort. Seventeen of the subjects were classified as asymptomatic contact lens wearers, reporting a rating of 0 or 1 out of 5 for Intensity of contact lens dryness/discomfort and "rarely or never" for Frequency of contact lens dryness/discomfort.

After a washout period of 3-7 days during which subjects wore their habitual lenses, the second lens type from the randomization order (i.e. either the Example 1 (test) or MyDay® brand (control) contact lenses) were worn for 1-month. Ratings of comfort, dryness, cooling, pleasantness as well as CLDEQ-8 score were monitored (see Chalmers et al., supra).

At the 1-week time point, the test lens was rated as significantly less pleasant at insertion than the control lens, however this difference decreased after 1 month of wear. This change may be attributed to a decrease in cooling sensation, possibly due to sensory adaptation in subjects wearing the test lens. There was no significant difference in the rating of overall comfort between test and control lenses at the 1-week or 1-month time points. Yet, twice as many subjects reported an increase in comfort with the test lens compared to the control lens after 1 month of wear. There was significantly better (i.e. lower) overall dryness ratings at both 1 week and 1 month with the test lens compared to the control lens. Tear meniscus height was measured using a Visante OCT (Carl Zeiss Meditec Inc., Dublin, Calif) and was significantly increased after one month of wearing the test lens compared to the control lens. The CLDEQ-8 score was significantly lower after 1 month of wearing the test lens compared to the control lens. The difference was statistically significant among symptomatic subjects. After 1 month of lens wear, out of the 33 subjects, 19 (58%) preferred the test lens, 11 (33%) preferred the control lens and 3 (9%) reported no preference. Among the 16 symptomatic subjects, 11 (69%) preferred the test lens and 5 (31%) preferred the control lens. Results are depicted in FIG. 1.

The disclosure herein refers to certain illustrated examples, it is to be understood that these examples are presented by way of example and not by way of limitation. The intent of the foregoing detailed description, although discussing exemplary examples, is to be construed to cover all modifications, alternatives, and equivalents of the examples as may fall within the spirit and scope of the invention as defined by the additional disclosure.

References herein to "an example" or "a specific example" or "an aspect" or "an embodiment" or similar phrase, are intended to introduce a feature or features of the WS12-releasing hydrogel contact lens or components thereof, the sealed contact lens package or components thereof, or method of manufacturing the WS12-releasing hydrogel contact lens (depending on context) that can be combined with any combination of previously-described or subsequently-described examples, aspects, embodiments (i.e. features), unless a particular combination of features is mutually exclusive, or if context indicates otherwise. Further, as used in this specification, the singular forms "a," "an," and "the" include plural referents (e.g. at least one or more) unless the context clearly dictates otherwise. Thus, for example, reference to a "contact lens" includes a single lens as well as two or more of the same or different lenses.

The entire contents of all cited references in this disclosure, to the extent that they are not inconsistent with the present disclosure, are incorporated herein by reference.

The present invention can include any combination of the various features or embodiments described above and/or in the claims below as set forth in sentences and/or paragraphs. Any combination of disclosed features herein is considered part of the present invention and no limitation is intended with respect to combinable features.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof

What is claimed is:

1. An unworn sterile hydrogel contact lens immersed in a packaging solution and sealed in a package, said contact lens comprising:
   (a) a polymeric lens body; and
   (b) an amount of N-(4-methoxyphenyl)-5-methyl-2-(1-methylethyl)cyclohexane carboxamide (WS12) releasably adhered to the polymeric lens body,
wherein the packaging solution has a concentration of WS12 that is less than 0.1 μg/ml.

2. The unworn sterile hydrogel contact lens of claim 1, wherein the packaging solution has a concentration of WS12 that is less than 0.05 μg/ml.

3. The unworn sterile hydrogel contact lens of claim 1, wherein the packaging solution has a concentration of WS12 that is less than the level of detection as determined by HLPC.

4. The unworn sterile hydrogel contact lens of claim 1, said contact lens having an in vitro release profile of 0.05 μg to 0.5 μg WS12 after 1 hour in a release media consisting of 25 vol. % EtOH in PBS.

5. The unworn sterile hydrogel contact lens of claim 1, wherein the polymeric lens body is a reaction product of a polymerizable composition comprising at least one siloxane monomer and at least one hydrophilic monomer or at least one hydrophilic polymer or both at least one hydrophilic monomer and at least one hydrophilic polymer.

6. The contact lens of claim 1, wherein the amount of WS12 releasably adhered to the polymeric lens body is from about 0.25 μg to 10.0 μg.

7. The unworn sterile hydrogel contact lens of claim 1, wherein the amount of WS12 releasably adhered to the polymeric lens body is from about 0.50 μg to 5.0 μg.

8. The unworn sterile hydrogel contact lens of claim 1, wherein the contact lens sustains release of WS12 for at least 6 hours in the release media.

9. The unworn sterile hydrogel contact lens of claim 1, wherein the release profile comprises release of 0.05 μg to 0.5 μg WS12 per hour for up to 6 hours.

10. The unworn sterile hydrogel contact lens of claim 1, wherein the release profile comprises release of 0.1 μg to 0.3 μg WS12 per hour for up to 6 hours.

11. The unworn sterile hydrogel contact lens of claim 1, wherein the package is autoclaved.

12. The unworn sterile hydrogel contact lens of claim 1, wherein the package comprises:
    (a) a base member having a cavity that retains the packaging solution; and
    (b) a cover that forms a liquid-tight seal with the base member.

13. A method for correcting vision of a symptomatic contact lens wearer, said method comprising wearing the unworn sterile hydrogel contact lens of claim 1.

14. The method of claim 13, wherein said method reduces symptoms of dryness in the symptomatic contact lens wearer.

15. The method of claim 13, wherein said method increase a comfortable lens wearing time by the symptomatic contact lens wearer.

16. The method of claim 13, wherein the method increases a tear meniscus height of the symptomatic contact lens wearer.

17. The method of claim 13, wherein the method lowers a CLDEQ-8 scores in the symptomatic lens wearer.

18. A composition for use in correcting vision of a symptomatic contact lens wearer; for use in reducing symptoms of dryness in a contact lens wearer; for use in increasing comfortable lens wearing time by a contact lens wearer; for use in increasing tear meniscus height of a contact lens wearer; and/or for use in lowering CLDEQ-8 scores in a contact lens wearer, wherein the composition comprises an amount of WS12 releasably adhered to a polymeric silicone hydrogel contact lens body; wherein the composition is in the form of the unworn sterile hydrogel contact lens of claim 1 immersed in a packaging solution.

19. A method of increasing the duration of comfortable contact lens wearing time and/or reducing contact lens dryness in a symptomatic contact lens wearer, by releasably adhering an amount of WS12 to a polymeric lens body of a silicone hydrogel contact lens to form the unworn sterile hydrogel contact lens of claim 1 and providing the unworn sterile hydrogel contact lens to the symptomatic contact lens wearer.

20. A method of manufacturing the unworn sterile hydrogel contact lens of claim 1, said method comprising:
    (a) polymerizing a polymerizable composition in a contact lens mold to obtain the polymeric lens body;
    (b) removing the polymeric lens body from said contact lens mold;
    (c) extracting the polymeric lens body in an extraction solvent comprising at least 1.0 μg/ml WS12;
    (d) hydrating the polymeric lens body in a hydration liquid to obtain a hydrogel contact lens;
    (e) sealing said hydrogel contact lens with packaging solution in a package; and
    (f) autoclaving said package.

21. A contact lens immersed in a packaging solution and sealed in a package, said contact lens is unworn sterile silicone hydrogel contact lens and comprising:
    (a) a polymeric lens body; and
    (b) an amount of WS12 releasably adhered to the polymeric lens body, wherein the contact lens releases from 0.05 μg to 0.50 μg WS12 after one hour of wear by a human subject; and
    (c) the packaging solution has a concentration of WS12 that is less than 0.1 μg/ml.

22. The contact lens of claim 21, wherein the contact lens releases from 0.10 μg to 1.5 μg WS12 after three hours of wear by a human subject.

23. The contact lens of claim 21, wherein the contact lens releases from 0.25 μg to 2.0 μg WS12 after six hours of wear by a human subject.

24. A kit comprising at least two WS12-releasing contact lenses each immersed in a packaging solution and sealed in a package, sterilized and packaged in secondary packaging,
    wherein a first contact lens comprises a first polymeric lens body and a first amount of WS12 releasably adhered to the first polymeric lens body, and a second contact lens comprising a second polymeric lens body and a second amount of WS12 releasably adhered to the second polymeric lens body, wherein the second amount is greater than the first amount, and wherein the first polymeric lens body and the second polymeric lens body comprise the same material; and
    wherein the packaging solution has a concentration of WS12 that is less than 0.1 μg/ml.

* * * * *